US008730151B2

(12) United States Patent
Jung et al.

(10) Patent No.: US 8,730,151 B2
(45) Date of Patent: May 20, 2014

(54) APPARATUS FOR WRITING IMAGE ON ELECTRONIC PAPER

(75) Inventors: Sun-Tae Jung, Yongin-si (KR); Dong-Hoon Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 716 days.

(21) Appl. No.: 12/197,823

(22) Filed: Aug. 25, 2008

(65) Prior Publication Data

US 2009/0051750 A1 Feb. 26, 2009

(30) Foreign Application Priority Data

Aug. 24, 2007 (KR) ........................ 10-2007-0085780

(51) Int. Cl.
*G09G 3/36* (2006.01)
*G09G 3/34* (2006.01)
*G06F 3/041* (2006.01)

(52) U.S. Cl.
USPC .............................. 345/107; 345/85; 345/173

(58) Field of Classification Search
USPC .................................................... 345/173, 85
See application file for complete search history.

(56) References Cited

U.S. PATENT DOCUMENTS

| | | | | |
|---|---|---|---|---|
| 5,389,945 | A * | 2/1995 | Sheridon | 345/85 |
| 2004/0212600 | A1* | 10/2004 | Kodama et al. | 345/173 |
| 2006/0029250 | A1* | 2/2006 | Karaki | 382/100 |
| 2006/0210339 | A1* | 9/2006 | Shimoda et al. | 400/76 |
| 2007/0229393 | A1* | 10/2007 | Ishii et al. | 345/1.1 |
| 2007/0285347 | A1 | 12/2007 | Karaki | |
| 2008/0024460 | A1 | 1/2008 | Kodama et al. | |

FOREIGN PATENT DOCUMENTS

| | | |
|---|---|---|
| JP | 2004-252308 | 9/2004 |
| KR | 1020060049653 | 5/2006 |

* cited by examiner

*Primary Examiner* — Amr Awad
*Assistant Examiner* — Andre Matthews
(74) *Attorney, Agent, or Firm* — The Farrell Law Firm, P.C.

(57) ABSTRACT

Disclosed is an apparatus for writing an image on electronic paper, the apparatus including a writing head having a plurality of pixel electrodes corresponding to a plurality of pixels forming an image, the writing head applying a voltage to the pixel electrodes according to inputted address signals and data signals; a driver for generating the address and data signals according to an inputted image frame signal and outputting the address and data signals to the writing head; and a controller for generating the image frame signal and outputting the image frame signals to the driver.

6 Claims, 5 Drawing Sheets

APPARATUS FOR WRITING IMAGE ON ELECTRONIC PAPER

PRIORITY

This application claims priority under 35 U.S.C. §119(a) to an application entitled "Apparatus for Writing Image on Electronic Paper" field in the Korean Industrial Property Office on Aug. 24, 2007 and assigned Serial No. 2007-85780, the contents of which are incorporated herein by reference.

BACKGROUND OF THE INVENTION

1. Field of the Invention

The present invention relates to electronic paper, and, more particularly, to an apparatus for writing an image on the electronic paper.

2. Description of the Related Art

Various types of electronic paper have been introduced, among which electrophoretic electronic paper developed by E Ink Corporation has been widely used. Conventional methods for forming image patterns on electronic paper include a segment type method and a TFT (Thin Film Transistor) driving type method.

According to the segment type method, electronic paper has a backplane, which is provided with an image pattern to be displayed by the electronic paper. This type of method has an advantage in that it is easy to implement due to the simple driving circuit. However, the method has a disadvantage in that the backplane must have a micro electrode pattern to realize a detailed image, and that an increased number of segments to be driven makes control difficult. The TFT driving type method is used to solve these problems. The TFT driving type method has widely been used to drive an LCD (Liquid Crystal Display) or an OLED (Organic Light Emitting Diode), and is also used to drive electronic paper.

Conventional electronic paper requires a backplane to form an image pattern, and the price of TFT backplanes with high resolution has increased substantially. This has severely limited commercialization of large-size electronic paper. In addition, although electronic paper has the advantage of flexibility, backplanes required by the segment type and TFT driving type methods increase the thickness of the electronic paper and adversely affect the flexibility. Furthermore, it is very inefficient to apply electronic paper having the above-mentioned backplanes to application devices, which change the image pattern implemented on the electronic paper at a long cycle.

Therefore, there is a need for an apparatus for writing an image on electronic paper, which is adapted for application devices having a long image pattern change cycle.

SUMMARY OF THE INVENTION

Accordingly, the present invention has been made to solve the above-mentioned problems occurring in conventional systems, and the present invention provides an apparatus for writing an image on electronic paper.

In accordance with one aspect of the present invention, there is provided an apparatus for writing an image on electronic paper, the apparatus includes a writing head having a plurality of pixel electrodes corresponding to a plurality of pixels forming an image, the writing head applying a voltage to the pixel electrodes according to inputted address signals and data signals; a driver for generating the address signals and the data signals according to an inputted image frame signal and outputting the address signals and the data signals to the writing head; and a controller for generating the image frame signal and outputting the image frame signal to the driver.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, a detailed description of known functions and configurations incorporated herein will be omitted when it may make the subject matter of the present invention rather unclear.

Figure 1:
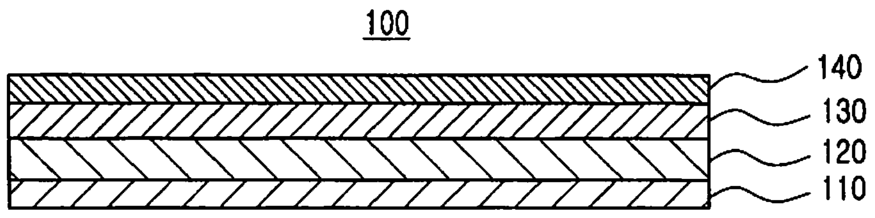
FIG. 1 illustrates the construction of electronic paper according to an exemplary embodiment of the present invention.

In FIG. 1, which shows the construction of electronic paper according to an exemplary embodiment of the present invention, electronic paper 100 is illuminated by light coming from the outside, and displays a plurality of symbols and images by reflecting the light. The symbols include the Korean alphabet, the Roman alphabet, numerals, special symbols, icons (e.g. a clock-shaped icon, a telephone-shaped icon, etc.) and so on, and the images include pictures, photographs, and so on. The electronic paper 100 includes a lower protection layer 110, an ink layer 120, a common electrode layer 130, and an upper protection layer 140, which are stacked one upon another.

The ink layer 120 represents a color or black/white image pattern based on migration via an electrophoretic phenomenon of particles when an electric field is applied, and displays symbols through reflection of external light incident on the pattern. For example, electrophoretic electronic paper developed by E Ink Corporation has microcapsules filled with a transparent fluid containing white and black particles, respectively, and arranged between circuit and common electrodes so that a black/white image pattern is displayed by applying an electric field to each microcapsule. The white particles are charged positively, and the black particles are charged negatively, so that they migrate in opposite directions according to the applied electric field. The image pattern of the ink layer 120 is maintained until the electric field is changed. The electronic paper 100 according to the present invention can display black/white symbols or color symbols. The color display is implemented by stacking a color filter on the ink layer 120, replacing the black/white particles constituting the ink layer 120 with colored particles, or illuminating the electronic paper 100 by monochromatic or polychromatic light.

The lower protection and upper protection layers 110 and 140 are stacked on opposite sides of the lower and upper surfaces of the ink layer 120, respectively, and have a moisture-proof function to protect the ink layer 120, which is vulnerable to moisture.

The common electrode layer 130 may be interposed between the ink layer 120 and the upper protection layer 140 and connected to an external ground.

Figure 2:
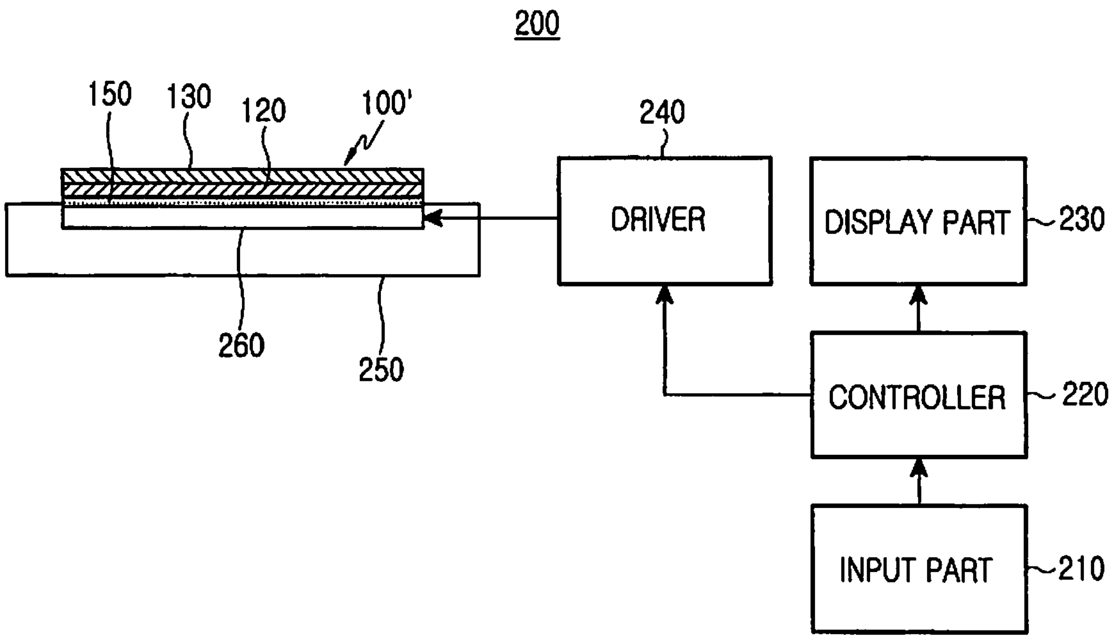
FIG. 2 provides a block diagram of an apparatus for writing an image on electronic paper according to a first exemplary embodiment of the present invention.
Figure 3:
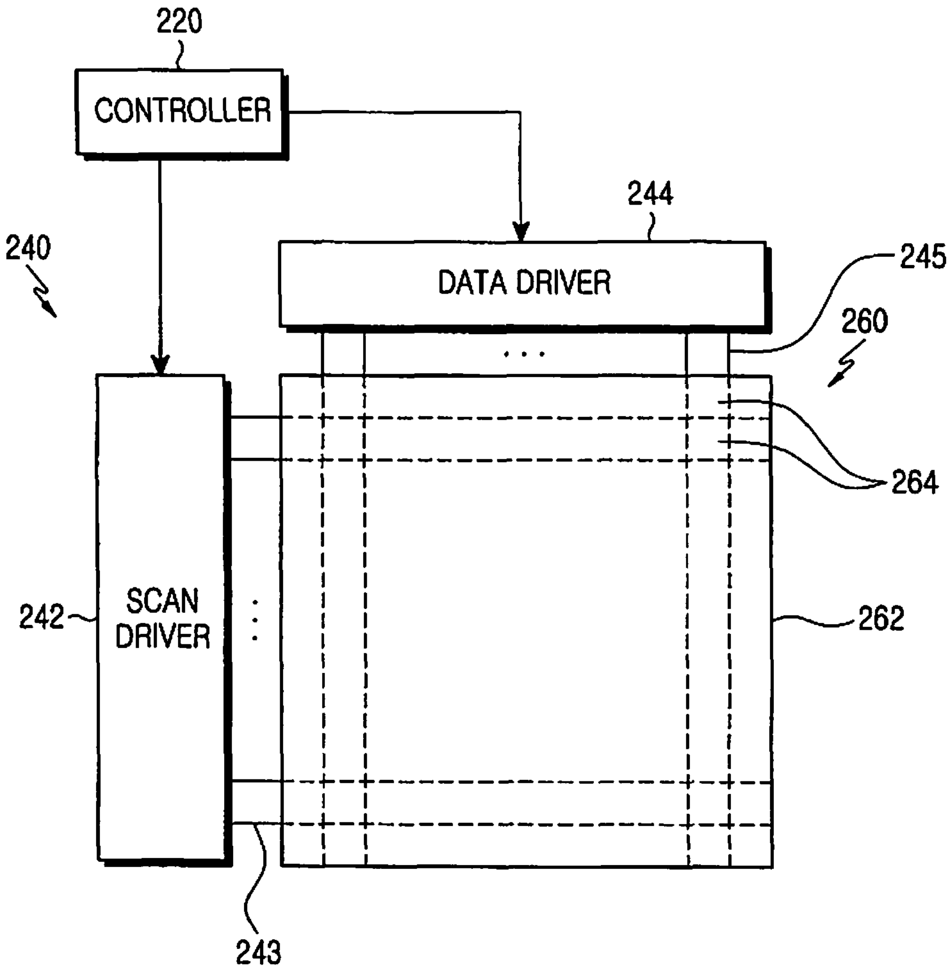
FIG. 3 illustrates a driver shown in FIG. 2.
Figure 4:
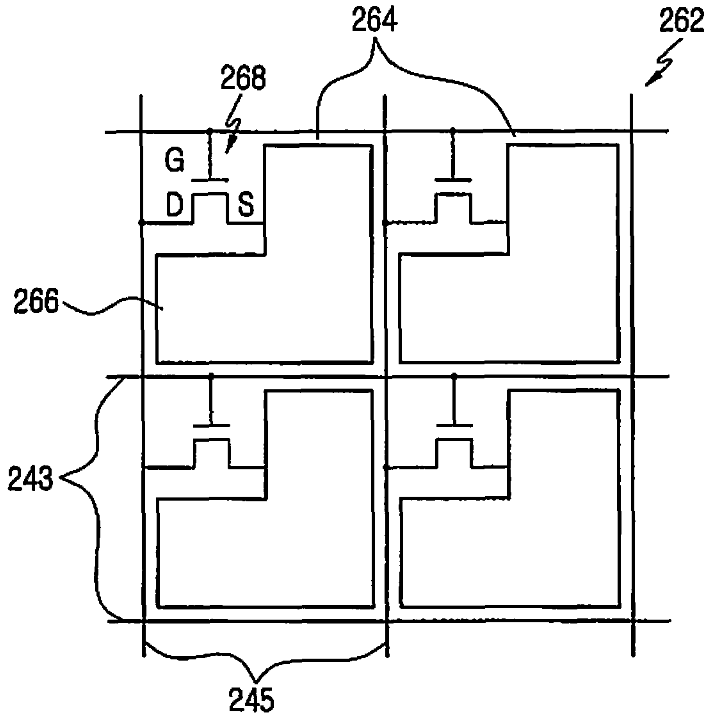
FIG. 4 illustrates a circuit layer of a writing head shown in FIG. 2.

FIG. 2 provides a block diagram of an apparatus for writing an image on electronic paper according to a first exemplary embodiment of the present invention, FIG. 3 shows a driver of FIG. 2, and FIG. 4 shows a circuit layer of a writing head.

The apparatus 200 includes an input part 210, a controller 220, a display part 230, a driver 240, a support table 250, and a writing head 260.

The input part 210 serves as a user interface and receives the user's input of information regarding images. The input part 210 may include conventional devices used for inputting and editing pictures and documents, such as a conventional computer keyboard, a memory card reader, an Internet communication device, a scanner, a digitizer, and so on.

The controller 220 generates an image frame signal according to the user's selection, and outputs the image frame signal to the display part 230 and/or the driver 240. The user may correct an image displayed on the display part 230 and command that the image be transferred to electronic paper 100'. The controller 220 may be an image signal processor, a microprocessor built into a computer, or a combination of both.

The display part 230 displays the image frame signal inputted from the controller 220 on a screen. The display part 230 may include a CRT (Cathode-Ray Tube) monitor, a liquid crystal display monitor, and so on.

The driver 240 generates address signals and data signals according to the image frame signal inputted from the controller 220, and outputs the address and data signals to the writing head 260. The driver 240 includes a scan driver 242 and a data driver 244, as shown in FIG. 3. The scan driver 242 supplies the address signals sequentially to scan lines 243 under the control of the controller 220, and the data driver 244 supplies data signals to data lines 245 under the control of the controller 220. The driver 240 may include a driving logic suitable for the characteristics of the electronic paper 100', and the driving logic may be implemented to eliminate the after-image of an inputted image, for example, so that the newly-generated image is efficiently written on the electronic paper 100'.

The writing head 260 is seated on the top of the support table 250, and has a circuit layer 262 (FIG. 4), which is divided into a plurality of pixels 264, on the top of the circuit layer 262. The circuit layer 262 includes a plurality of pixel electrodes 266 and a plurality of TFTs 268. Each of the pixel electrodes 266 is connected to a corresponding scan line 243 and a corresponding data line 245 through a corresponding TFT 268.

Each TFT 268 has a gate (G) connected to a corresponding scan line 243, a drain (D) connected to a corresponding data line 245, and a source (S) connected to a corresponding pixel electrode 264. Each of the TFTs 268 serves as an on/off switch, and is turned on only when signals are supplied to both the scan line 243 and the data line 245 connected to a particular TFT 268. When the TFT 268 is turned on, a voltage is applied to the corresponding pixel electrode 266. The TFTs 268 may be formed by performing a LTPS (Low Temperature Polysilicon) process on a glass substrate, by performing an amorphous silicon manufacturing process, or by using silicon crystalline as a substrate.

The performance of the writing head 260 is degraded in the order of the silicon crystalline-based type, the LTPS-based type, and the amorphous silicon-based type. However, there is also an advantage in that the process temperature decreases in the same order, and it becomes easier to increase the size. In addition to these types of methods, it is also possible to use an organic semiconductor for application to a substrate having flexibility or curved surfaces.

The electronic paper 100' is attached to the writing head 260 by using an adhesive 150 (FIG. 2) after the lower protection layer has been removed, and the ink layer 120 of the electronic paper 100' faces the circuit layer 262 of the writing head 260. A part of the upper protection layer is removed for external connection of the common electrode layer. As such, although it is unnecessary to remove the entire upper protection layer, it may be removed partially, if necessary. The ink layer 120 displays a black/white or color image pattern via particles moving according to the electric field applied between the common electrode layer 130 and the circuit layer 262 of the writing head 260.

After the image transfer process using the writing head 260 is completed, the electronic paper 100' is removed from the writing head 260, and the lower protection layer is again attached to the lower surface of the electronic paper 100'. Also, the part of the upper protection layer, which has been removed for external connection of the common electrode layer, is again attached to the upper surface of the electronic paper 100' after removing the external connection. The electronic paper 100' has an image pattern created through the image transfer process, and the image pattern is maintained until the next image transfer process.

Figure 5:
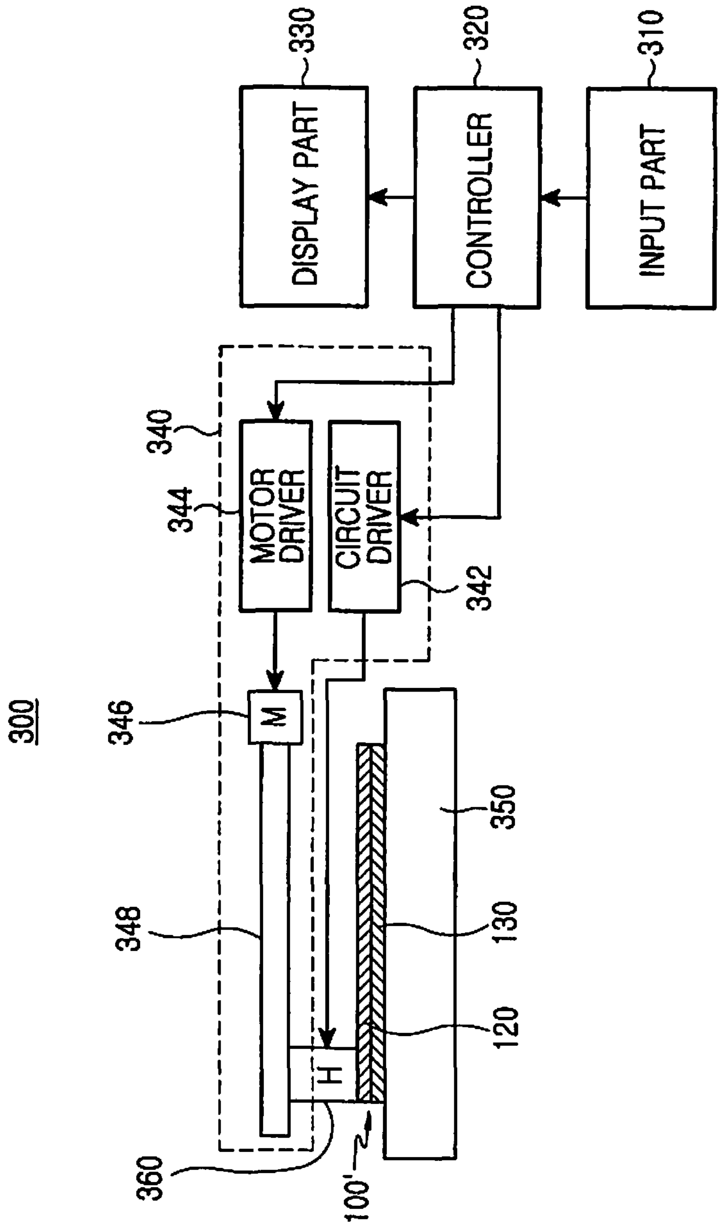
FIG. 5 provides a block diagram of an apparatus for writing an image on electronic paper according to a second exemplary embodiment of the present invention.
Figure 6:
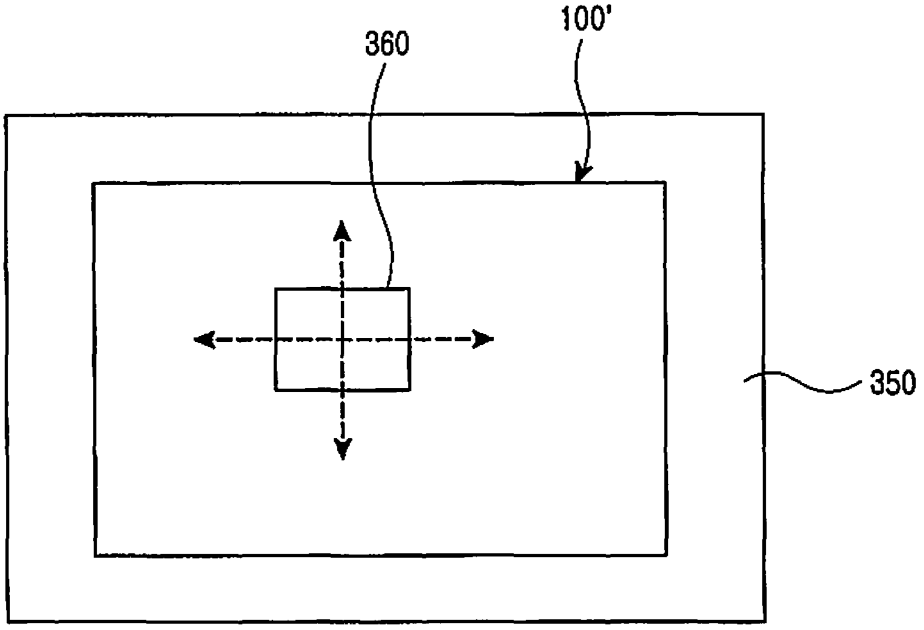
FIG. 6 is a top view illustrating the movement of the writing head shown in FIG. 5.

FIG. 5 provides a block diagram of an apparatus for writing an image on electronic paper according to a second exemplary embodiment of the present invention, and FIG. 6 is a top view illustrating the movement of the writing head.

The apparatus 300 includes an input part 310, a controller 320, a display part 330, a driver 340, a support table 350, and a writing head (H) 360.

The input part 310 serves as a user interface and receives the user's input of information regarding an image. The controller 320 generates an image frame signal according to user's selection and outputs the image frame signal to the display part 330 and/or the driver 340. The display part 330 displays the image frame signal, which has been inputted from the controller 320, on a screen.

The driver 340 includes a circuit driver 342, a motor driver 344, a motor (M) 346, and a guide 348.

The circuit driver 342 generates address and data signals according to the image frame signal inputted from the controller 320, and outputs the address and data signals to the writing head 360. The circuit driver 342 includes a scan driver (not shown) and a data driver (not shown). The scan driver supplies address signals sequentially to scan lines under the control of the controller 320, and the data driver supplies data signals to data lines under the control of the controller 320. The circuit driver 342 may include a driving logic suitable for the characteristics of the electronic paper 100', and the driving logic may be implemented to eliminate the after-image of an inputted image, for example, so that the newly-generated image is efficiently written on the electronic paper 100'.

The writing head 360 is provided with a circuit layer (not shown), which includes a plurality of pixel electrodes and a plurality of TFTs. The pixel electrodes correspond to some pixels of the image one by one, and each of the pixel electrodes is connected to a corresponding scan line and a corresponding data line through a corresponding TFT. That is, the circuit layer of the writing head 360 has a construction similar to that of the circuit layer 262 of the writing head 260 shown in FIG. 4, and the difference lies only in the fact that the number of the pixels in the circuit layer of the writing head 360 is smaller than that of the circuit layer 262 of the writing head 260. The writing head 360 can write a partial area of an image at a time. This means that the writing head 360 moves on the electronic paper 100' to write the entire area of the image.

The motor driver 344 generates a driving signal according to a control signal inputted from the controller 320 and outputs the driving signal to the motor 346. The motor 346 generates driving force according to the driving signal inputted from the motor driver 344 and provides the guide 348 with the driving force.

The guide 348 supports the writing head 360 so that the circuit layer of the writing head 360 is directed toward the support table 350, and makes one-dimensional movement (forward or backward) or two-dimensional movement (forward, backward, right, and left) according to the driving force supplied from the motor 346.

The electronic paper 100' is mounted on the support table 350 after the lower protection layer has been removed, and the ink layer 120 of the electronic paper 100' faces the circuit layer of the writing head 360. A part of the upper protection layer is removed for external connection of the common electrode. As such, although it is unnecessary to remove the entire upper protection layer, it may be removed partially, if necessary. The ink layer 120 displays a black/white image pattern via particles moving according to the electric field applied between the common electrode layer 130 and the circuit layer of the writing head 360.

After the image transfer process using the writing head 360 is completed, the electronic paper 100' is removed from the support table 350, and the lower protection layer is again attached to the lower surface of the electronic paper 100'. Also, the part of the upper protection layer, which has been removed for external connection of the common electrode layer, is again attached to the upper surface of the electronic paper 100' after removing the external connection. The electronic paper 100' has an image pattern created through the image transfer process, and the image pattern is maintained until the next image transfer process.

The apparatus for writing an image on electronic paper according to the present invention is advantages in that, in the case of electronic paper having a long image pattern change cycle (e.g. commercial wallpapers, case images of small devices), the removal of backplanes and driving circuits reduces the price and thickness of the electronic paper and improves the flexibility.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for writing an image on electronic paper, the apparatus comprising:

a writing head having a plurality of pixel electrodes corresponding to a plurality of pixels forming an image, the writing head applying a voltage to select pixel electrodes according to input address signals and data signals;

a driver for generating the address and data signals according to a user input and outputting the address and data signals to the writing head; and a controller for generating an image frame signal and outputting the image frame signal to the driver, wherein the writing head comprises pixel electrodes corresponding to all pixels forming the image, and the writing head and the electronic paper are fixed with respect to each other by attaching an entire lower surface of the electronic paper to the writing head while the writing head is writing the image on the electronic paper, and wherein the electronic paper includes an ink layer and a common electrode layer, and the writing head writes the image on the electronic paper by applying an electric field between the common electrode layer of the electronic paper and the pixel electrodes of the writing head.

2. The apparatus as claimed in claim 1, wherein the writing head further comprises a plurality of thin film transistors, and each of the pixel electrodes is connected to a corresponding scan line and a corresponding data line of the driver through a corresponding thin film transistor.

3. The apparatus as claimed in claim 1, further comprising:

an input part for receiving from a user an input of information regarding an image; and a display part for displaying the image frame signal input from the controller on a screen.

4. The apparatus as claimed in claim 2, wherein the driver comprises:

a scan driver for sequentially supplying address signals to the scan lines under the control of the controller; and a data driver for supplying data signals to the data lines under the control of the controller.

5. The apparatus as claimed in claim 1, wherein the electronic paper is attached to the writing head via an adhesive.

6. The apparatus as claimed in claim 4, wherein the driver further comprises:

a motor driver for generating a driving signal under the control of the controller;

a motor for supplying driving force according to the driving signal; and a guide for moving the writing head via the driving force supplied from the motor.

* * * * *